INVENTOR:
LAWRENCE D. BURCZ

United States Patent Office 3,541,885
Patented Nov. 24, 1970

3,541,885
POWER SHIFT TRANSMISSION FOR RACING VEHICLES
Lawrence D. Burcz, Detroit, Mich., assignor to Ford Motor Company, Dearborn, Mich., a corporation of Delaware
Filed Jan. 16, 1969, Ser. No. 791,672
Int. Cl. F16h 47/06, 3/10
U.S. Cl. 74—720      7 Claims

ABSTRACT OF THE DISCLOSURE

A racing car transmission comprising a hydrokinetic coupling and two-speed-ratio gearing, power input elements of the gearing being located concentrically with respect to the turbine of the coupling, the output gearing element being mounted for rotation about the axis of the countershaft, controllable clutch structure for conditioning the mechanism for operation in either the high-speed ratio condition or one of two low-speed ratio conditions, and semi-automatic control valves for establishing non-synchronized ratio changes.

GENERAL DESCRIPTION OF THE INVENTION

My invention is adapted especially to be used in the driveline of racing vehicles wherein frequent speed ratio changes during high speed operation are necessary. The improved transmission mechanism of my invention is characterized by two, closely spaced, forward driving speed ratios. It is characterized by two low-speed drive conditions, one being adaptable for acceleration from a standing start following pit stops on the racing trackway and the other low-speed ratio being available during acceleration periods after the vehicle is in motion.

In the first low-speed drive condition a hydrokinetic coupling is introduced into the torque delivery path for the purpose of establishing the necessary slip motion when the vehicle is accelerated following a pit stop. This is done by shifting a dog clutch into a disengaged position to interrupt a direct driving connection between the engine and the multiple ratio gearing. In the other low-speed drive condition with the vehicle in motion, the dog clutch is engaged thereby establishing a bypass around the hydrokinetic unit and through an overrunning coupling as torque is delivered directly from the engine crankshaft to the power input elements of the gearing. By disengaging the dog clutch, the hydrokinetic unit is made part of the power flow train.

A non-synchronous ratio shift from the low-speed ratio to the high-speed ratio is achieved by engaging a high-speed clutch. Under these circumstances the overrunning coupling freewheels as torque is delivered directly from the engine through the high-speed ratio gearing to the power input element.

Simplified control valving is used to control ratio changes between neutral and drive and between high-speed ratio operation and low-speed ratio operation. This is achieved by solenoid controlled orifices which in turn establish and disestablish a pressure signal that is sensed by automatic shift valves. The control circuit for controlling ratio changes includes also a regulator valve that functions in cooperation with an accumulator valve to decrease circuit pressure on a 2–1 downshift, thereby reducing the undesirable effects of a tie-up between the high-speed ratio clutch and the low-speed ratio clutch.

When the control system conditions the mechanism for an upshift from the low-speed ratio to the high-speed ratio, the low-speed clutch servo is designed to lose capacity only after the high-speed ratio clutch has been stroked. The same pressure that controls the rate of low clutch servo pressure decay is used to establish high-speed ratio clutch engagement.

The operation of the servos in this fashion, together with the overrunning coupling, produces a non-synchronous, clutch-to-clutch upshift without the undesirable effects of a clutch tie-up in the driveline.

A simple control lever, which is in addition to the electrical switch control for controlling ratio changes, is available to the operator for selecting the operating condition of the overrunning coupling. During ratio changes after the vehicle is in motion, the mechanical control lever for controlling the overrunning clutch need not be operated. In this way a simplified switching arrangement provides the operator with fingertip control, thereby enabling him to meet all driving conditions on the trackway without distraction.

Coast-braking is available as torque is delivered from the output shaft through the low-speed ratio gearing to the turbine of the hydrokinetic unit. Because of the inherent speed-up condition that is achieved, the overrunning coupling freewheels. It is not necessary to actuate the overrunning coupling control lever to achieve coast-braking.

BRIEF DESCRIPTION OF THE FIGURES OF THE DRAWINGS

FIGS. 1A and 1B show an enlarged cross-sectional view of the transmission structure illustrated in FIG. 1.

FIG. 1C is a schematic representation of an alternate embodiment of my invention, which includes a hydrokinetic torque converter in lieu of a fluid coupling.

PARTICULAR DESCRIPTION OF THE INVENTION

Figure 1:
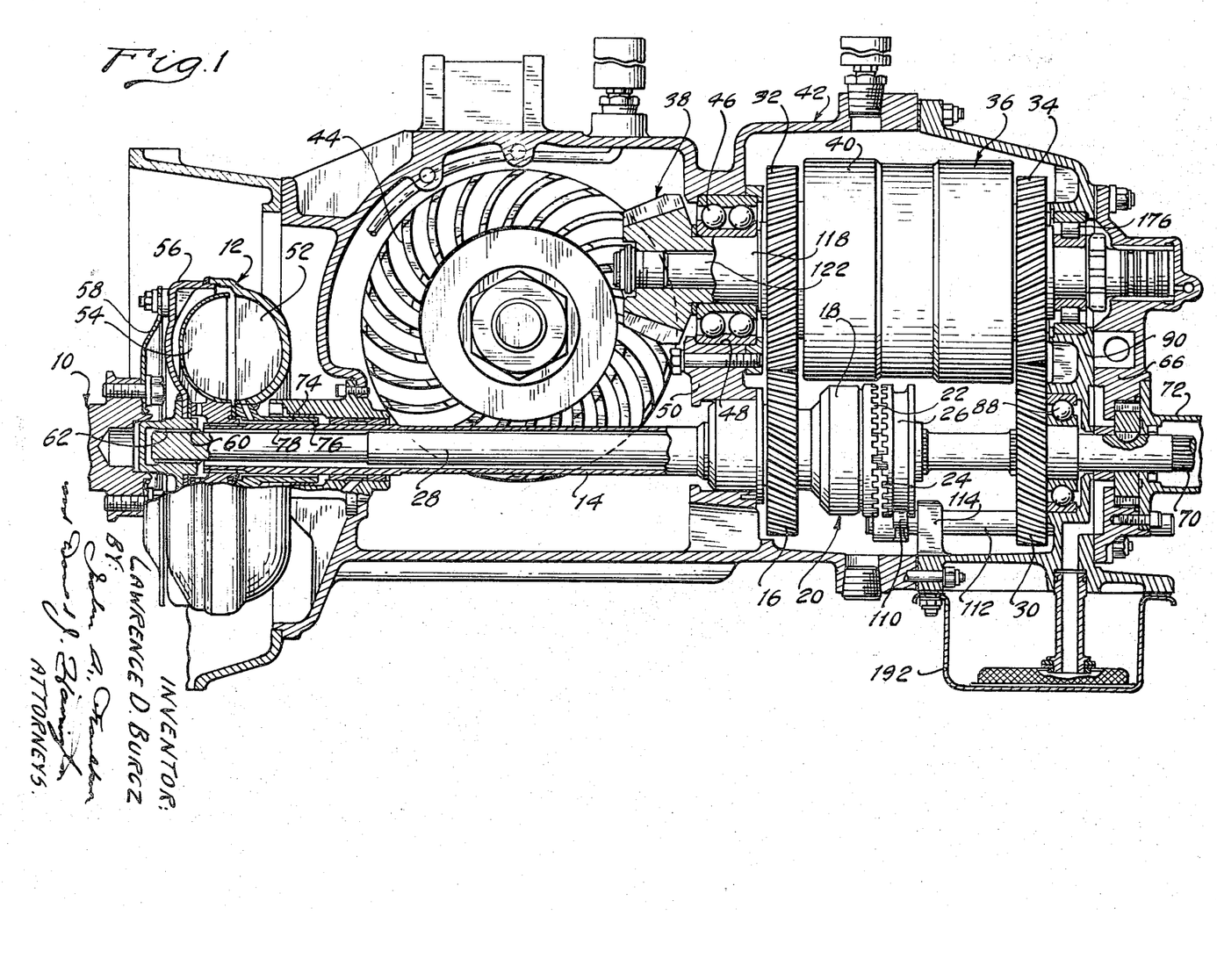
FIG. 1 shows an assembly view, partly in elevation, of my improved transmission structure exclusive of the control system.

In FIG. 1 numeral 10 designates one end of the crankshaft of an internal combustion engine. It is drivably connected to the impeller of a hydrokinetic coupling 12. The turbine of the coupling 12 is connected by means of a cross shaft 14 to a power input low-speed ratio gear 16 and to the outer race 18 of an overrunning coupling 20. The inner race for the overrunning coupling 20 carries dog clutch teeth 22, which are adapted to mesh with dog clutch teeth 24 formed on clutch sleeve 26. The sleeve is slidably splined to shaft 28 which extends concentrically through the shaft 14. Shaft 28 is connected directly to the engine crankshaft 10.

Shaft 28 is connected drivably to power-input, high-speed ratio gear element 30.

Gear element 16 meshes with low-speed ratio output gear 32. Gear element 30 meshes with high-speed ratio output gear 34. High-speed ratio clutch 36 connects the gear 34 to power output pinion 38 and low-speed ratio clutch 40 connects gear 32 to the power output pinion 38.

The gearing and the associated clutches are located in housing 42 at its right-hand end. The left-hand portion of the housing 42 encloses a hypoid ring gear 44. This gear forms an input gear element for a differential gear unit having two output gears each of which is connected to a separate axle shaft. Ring gear 44 meshes with pinion 38 which is journalled by means of a thrust ball bearing 46 in an opening 48 formed in a bearing support wall 50. This wall forms a part of the housing 42.

FIGS. 1A and 1B show the structure of FIG. 1 in more particular detail. The coupling 12, as seen in FIG. 1A, includes a bladed impeller 52 and a bladed turbine 54 situated in toroidal fluid flow relationship. The impeller shell 56 is drivably connected to the crankshaft 10 by means of a drive plate 58. The impeller shell includes a hub 60 which is splined directly at 62 to the shaft 28. The right-hand end of the shaft 28, as seen in FIG. 1B, extends through an opening 64 formed in end plate 66 which in turn is secured to housing 42, suitable bolts 67 being provided for this purpose.

A gear pump is enclosed in the cover plate 66. It includes a gear element 68, which is keyed to the shaft 28. The end of the shaft 28 is splined at 70 to permit a connection with an auxiliary engine starter motor. This end of the shaft 28 is shrouded by a cover plate 72.

The pump shown in part at 68 supplies circuit pressure for the control valve body, which also is contained in the cover plate 66. It also supplies fluid under pressure for the fluid coupling 12. Fluid is distributed through a passage, not shown, to the annular space between sleeve shaft 14 and a sleeve hub 74. That space is indicated by reference numeral 76. Fluid will be returned to the lube circuit defined in part by the annular space between shaft 28 and the sleeve shaft 14 as shown at 78.

Sleeve shaft 14 is journalled by bearing assembly 80 within an opening 82 formed in the wall 50.

Shaft 14 is connected directly to low-speed ratio power input gear 84, and the shaft 28 is directly splined to high-speed ratio power input gear 86. This gear is journalled rotatably by means of bearing 88 in the end wall 90 for the housing 42.

Gear 84 includes an extension that forms the outer race 92 for an overrunning coupling 94. It includes also an inner race 96 and overrunning coupling roller elements 98. The race 96 carries dog clutch teeth 100. These are adapted to register with companion dog clutch teeth 102 carried by clutch sleeve 104. The sleeve 104 is splined slidably to clutch hub 106. This in turn is splined at 108 to the shaft 28.

When the sleeve 104 is shifted in a left-hand direction, dog clutch 100 and 102 become engaged thereby locking the inner race 96 to the shaft 28. To facilitate shifting movement of the sleeve 104, it is provided with a groove within which a shift fork 110 is adapted to register. Fork 110 is carried by shaft 112 supported by hub 114. The hub is apertured to receive slidably the shaft 112. Any suitable lever mechanism, such as that shown schematically at 114 in FIG. 1C, may be used to adjust the shaft 112 axially in either direction. Gear 84 meshes drivably with low-speed ratio output gear 116 journalled on sleeve shaft 118 which is connected directly to the output pinion 38. An externally splined clutch element 120 is connected directly to the gear 116.

Sleeve shaft 118 surrounds a support shaft 122 having a shoulder 124 engaged by the end of the shaft 118. Shaft 118 and the gear 38 are locked in place by lock nut 126 whereby the gear 38, the shaft 118 and the shaft 122 rotate in unison. The right-hand end of the shaft 122 is journalled in opening 126 formed in end coverplate 66. The opening 126 cooperates with the end of the shaft 122 to define a pressure distributor manifold for distributing pressurized fluid to passages 128, 130 and 132 formed on the shaft 122.

A clutch drum 134 is provided with axially spaced, internally splined portions 136 and 138, which carry externally splined clutch discs 140 and 142, respectively. Discs 140 are situated directly adjacent discs carried by the clutch element 120. Discs 142 are situated directly adjacent discs carried by externally splined clutch portion 144 which in turn is connected directly to the high-speed ratio output gear 146. This gear meshes directly with the high-speed ratio input gear 86.

Clutch drum 134 has a radially extending internal wall 148 and a hub 150 which is splined at 152 to the shaft 118. The drum 134 defines a pair of annular cylinders 154 and 156 which receive, respectively, annular pistons 158 and 160. A plurality of thrust elements 162 transfer pressure forces from a piston 158 to the multiple disc assembly shown in part at 140. These elements 162 are slidably received in openings formed in an annular wall 164 which surrounds the hub 150. Clutch piston return springs 166, the wall 164 and the piston 150 cooperate to define an annular cavity which is filled with fluid. The cavity is in fluid communication with the pressure chamber defined by the annular cylinder 156. Both that cylinder and the pressure cavity adjacent the wall 164 are in fluid communication with the passage 128.

The piston 160 carries a force transmitting element 168, which transfers the pressure forces acting on the piston 160 to the multiple disc assembly of which discs 142 form a part. An annular wall 170 surrounds a hub 150 and cooperates with a piston 160 to define a pressure cavity. Return springs 172 normally tend to urge the piston 160 in a left-hand direction.

The cavity adjacent the wall 170 is in fluid communication with lubrication oil passage 174. The annular cylinder 154 is in fluid communication with the axially-extending pressurized, fluid passage 130.

Gear 146 and the right-hand end of the shaft 122 are journalled by roller bearing 176 received in bearing opening 178 in the end wall 90.

FIG. 1C shows in schematic form the same power flow path illustrated particularly in FIGS. 1A and 1B. It includes, however, a hydrokinetic torque converter 12' with a stator 178 rather than a fluid coupling such as that shown at 12 in FIG. 1. In other respects the transmission of FIG. 1C is the same as that shown in FIGS. 1A and 1B. For this reason common reference characters are used.

To establish a neutral condition, both the high-speed clutch shown in part at 142 and the low-speed clutch shown in part at 140 are disengaged. The dog clutch teeth can either be engaged or disengaged. The torque delivery path extending from the hydrokinetic turbine to the output pinion 38 is interrupted.

To establish a low-speed ratio condition from a standing start, the high-speed ratio clutch and the dog clutch are disengaged; and the low-speed ratio clutch is engaged. Torque then is distributed from the engine crankshaft through the hydrokinetic unit and hence to the sleeve shaft 14. This powers gear 84 which drives gear 116. When the low-speed unit clutch is engaged, gear 116 is connected directly to the shaft 118. Torque then is distributed to each axle shaft through the associated differential gearing unit.

The fluid coupling provides a gradual start for the vehicle from a pit stop thereby avoiding the necessity for slipping the low-speed ratio clutch. After the vehicle is moving, low-speed ratio operation can be continued by engaging the dog clutch, thereby establishing a driving connection between gear 84 and the shaft 28. After the dog clutch is engaged, the crankshaft 10 is connected directly to the low-speed ratio gear 84 thereby bypassing the fluid coupling. The torque delivery path from the engine to the traction wheels then is entirely mechanical.

To establish a ratio shift to the high-speed ratio, the low-speed ratio clutch is disengaged and the high-speed ratio clutch is engaged. The dog clutch may be engaged or disengaged at this time. If it is engaged, the overrunning coupling 94 freewheels. Thus the only torque delivery path is through the gears 86 and 146 and through the high-speed ratio clutch.

To establish a coasting-drive condition while the vehicle is operating in the low-speed ratio drive range, a low-speed ratio clutch may remain applied while the overrunning coupling 94 freewheels. Thus the coupling is used both for acceleration from a pit stop as well as for coast braking. When the vehicle is in operation, the speeds of rotation of the pinion 38 may reach as high as 8,000 r.p.m. Under these conditions a substantial centrifugal pressure normally is developed in the annular cylinders 154 and 156. If either one or the other of the cylinders 154 or 156 is exhausted, a build-up of centrifugal pressure in that cylinder is undesirable. The walls 164 and 170 are provided, therefore, to establish a counterbalance pressure chamber to oppose these normal tendencies for the centrifugal pressure to apply the disc clutches when engagement is not desired.

The pressure cavity associated with the low-speed ratio clutch communicates with the high-speed ratio clutch pressure chamber through a common feed passage 128. On an upshift from the low-speed ratio to the high-speed ratio, the low-speed ratio clutch loses capacity only after the high-speed ratio clutch is stroked. The low-speed ratio clutch pressure decay is related inversely and directly to the pressure for the high-speed ratio clutch because of the common pressure feed passage.

Upshifts from the low-speed ratio to the high-speed ratio are entirely non-synchronous. The overrunning coupling 94 establishes an overrunning condition which momentarily introduces a fluid coupling into the torque delivery path during the shift interval. This avoids a clutch tie-up condition on ratio shifts thereby avoiding harshness and better ratio control.

Figure 3:
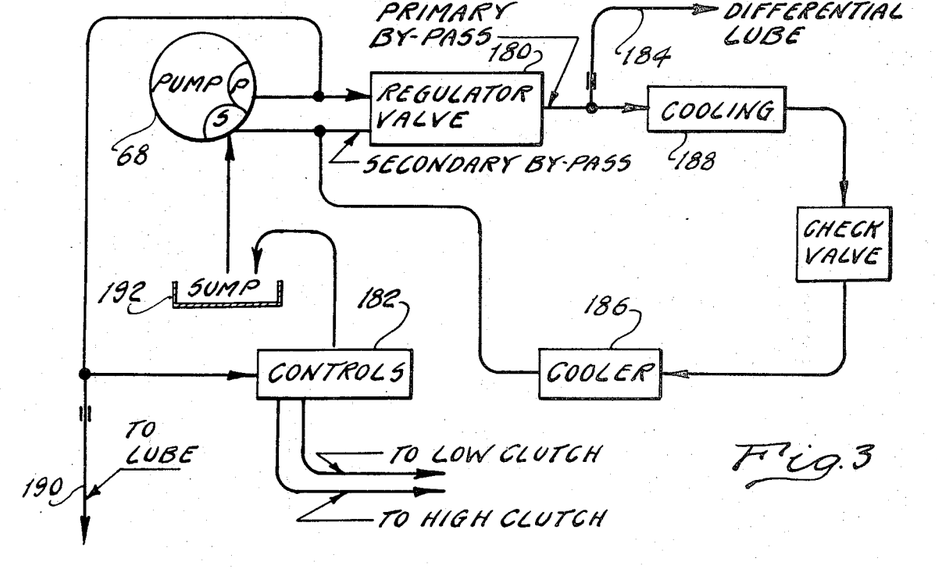
FIG. 3 is a block diagram illustrating the relationship of the principal elements of the control system with respect to each other.

The control elements for establishing ratio changes are illustrated schematically in FIG. 3. These include the pump shown in part at 68, a pressure regulator valve 180 and a control valve piton 182. Pressure from the pump 68 is regulated and the by-pass flow through the regulator 180 flows to a lubrication circuit 184 and to a cooler 186 through a cooling oil circuit 188. The upstream side of the regulator valve supplies a lubrication oil passage 190 through an orifice passage 184, which supplies differential gearing lubricant.

The sump, which is located in a lower region of the transmission structure, is schematically illustrated at 192. This may form a part of the lower region of the transmission housing 42. An oil pan may be secured to the lower side of the housing 42 to accommodate a suitable filter.

Figure 2:
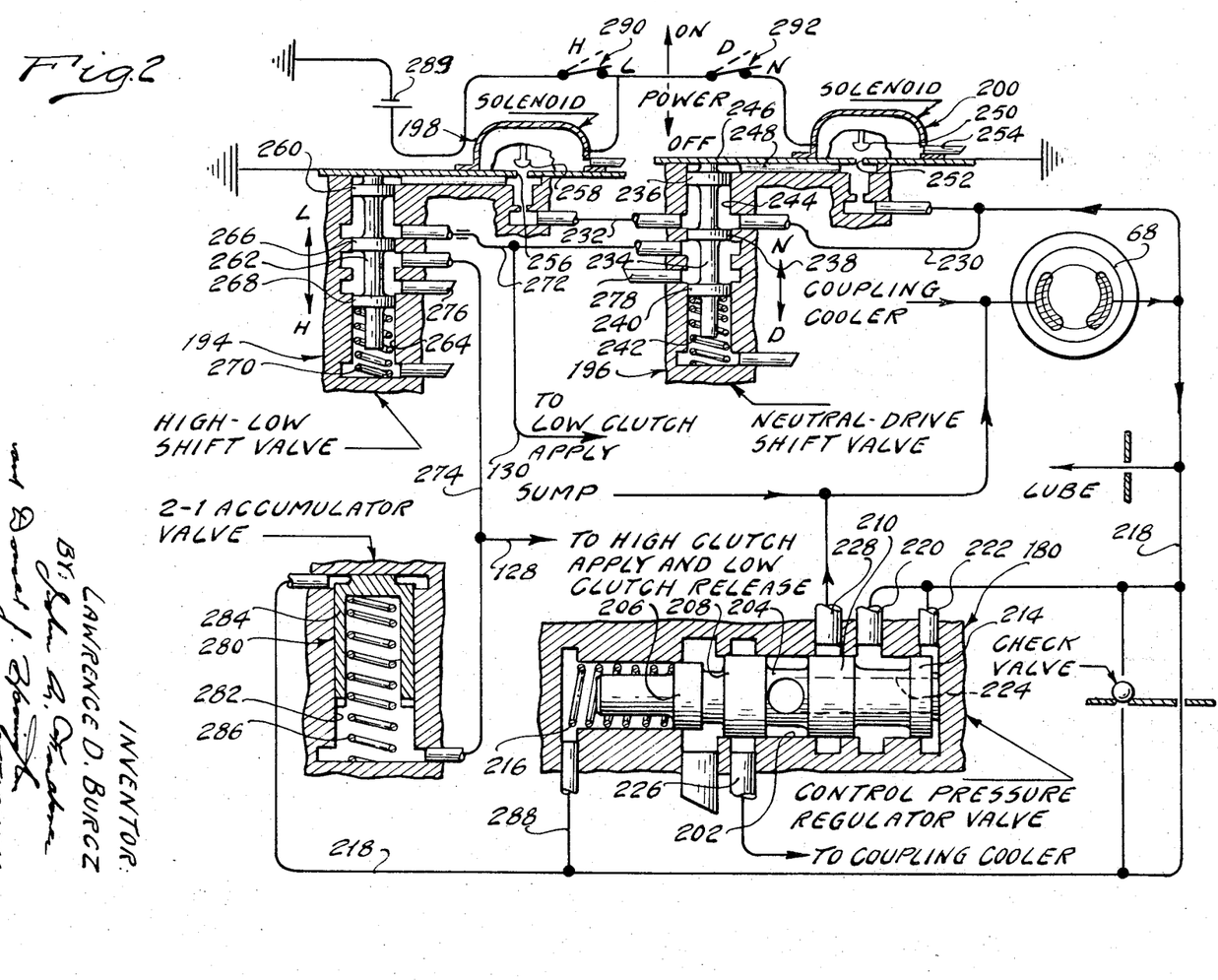
FIG. 2 shows a schematic valve circuit for controlling ratio changes in the transmission structure of FIGS. 1, 1A and 1B.

The control valve circuit 182 is illustrated in detail in FIG. 2. It includes a high-low shift valve 194. A neutral-drive shift valve 196 and solenoid valves 198 and 200.

Regulator valve 180, which is shown in particular in FIG. 2, includes a valve chamber 202 formed in a valve body and a valve spool 204 slidably positioned in the chamber 202. Spool 204 is formed with axially spaced valve lands 206, 208, 210 and 214 which slidably register with internal valve lands formed in the chamber 202. Valve spool 204 is urged in a right-hand direction, as viewed in FIG. 2, by valve spring 216. Pressure from the pump 68 is distributed through passage 218 to regulator valve ports 220 and 222. An internal passage 224 in the valve element 204 distributes pressure between the port 222 and coupling cooler port 226.

Land 210 controls the recommunication between high pressure supply passage 218 and low pressure outlet 228 for the regulator valve.

The neutral-drive shift valve 196 is supplied with regulated pressure through passage 230, which extends across the valve 196 to passage 232, which in turn supplies the solenoid valve 198. Passage 230 supplies solenoid valve 200 directly.

Valve 196 includes a valve spool 234 having spaced valve lands 236, 238 and 240. Valve spool 234 normally is biased in an upward direction by valve spring 242. Valve lands on the valve spool 234 register with internal valve lands formed in valve chamber 244 formed in the valve body. The upper end of the valve land 236 is supplied with pressure through signal passage 248 extending from the solenoid valve 200 which normally is closed; that is, valve element 250, which is movable in a downward direction, normally tends to close orifice 252 which communicates with the passage 248.

When the solenoid valve 200 is deenergized, element 250 seals orifice 252, thereby causing a pressure to develop on the upper side of the land 236 of the neutral-drive shift valve 196. When the orifice 252 is opened, fluid is allowed to pass therethrough to the exhaust port 254. Movement of the valve element 250 to its closed position then will cause the valve element 234 to move downwardly against the force of spring 242.

Passage 232 and passage 230 are in continuous communication with each other regardless of the position of the valve element 234. Passage 232 communicates with solenoid valve orifice 256 which is closed when the valve 198 is deenergized. At that time valve element 258 closes orifice 256.

When solenoid valve 198 closes, a pressure build-up occurs on the upper side of valve land 260. This land forms a part of valve element 262 located in valve chamber 264.

The element 262 includes also valve lands 266 and 268. Each of the valve lands for valve element 262 registers with an internal valve land in the chamber 264. Valve element 262 is urged in an upward direction by valve spring 270.

When the valve element 262 moves in a downward direction, communication is established between passage 272, which communicates with the low-speed ratio clutch pressure feed passage 130, and passage 274 which communicates with the high-speed ratio clutch pressure feed passage 128. When the valve element 262 assumes the position shown, passage 274 communicates with exhaust port 276.

Passage 272 communicates with exhaust port 278 in the neutral-drive shift valve 196 when the valve element 234 assumes the upward position. When the valve element 234 assumes a downward position, passage 232 communicates directly with the passage 272.

An accumulator valve 280 controls 2–1 downshifts. It includes a valve chamber 282 and a piston valve element 284 which is slidably positioned therein and urged in an upward direction by valve spring 286. Passage 274 communicates with the lower side of the piston 284. Pump supply passage 218 communicates with the upper side of the piston 284.

When the high-low shift valve 194 moves in an upward direction, communication is established between passage 274 and port 276. Passage 274 and the passage 128, which previously were pressurized for high-speed ratio operation, now become exhausted. The high-speed ratio clutch apply pressure now begins to decay, and the piston 284 strokes in a downward direction. This causes a momentary decrease in the magnitude of the pressure distributed to the spring chamber occupied by spring 216 since passage 218 communicates with that spring chamber through branch passage 288. After the low-speed clutch becomes applied with the reduced line pressure, the line pressure again assumes its normal operating level after the piston 284 is fully stroked. The application of the low-speed ratio clutch is cushioned in this fashion.

Figure 4:
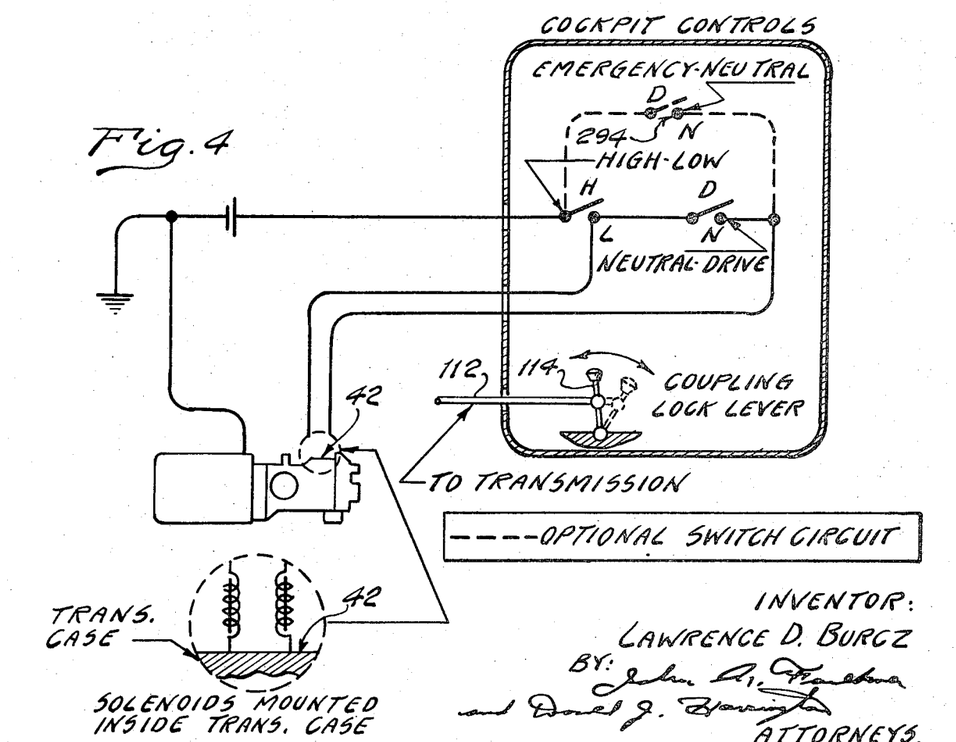
FIG. 4 shows in schematic form the electrical switching circuit associated with the control system of FIG. 2.

The voltage source 289 for the solenoid valves is connected with the solenoid switches 290 and 292 in series relationship. Solenoid valve 200 can be opened only when both switches 290 and 292 are closed. The selection of high-speed ratio or low-speed ratio with the switch 290 can be achieved only when the switch 292 is in the drive position.

It is possible for the operator to choose a neutral position at any time when the switch 290 is in the low-speed ratio position. In order to provide assurance that this can be achieved at any time, the use of a bypass neutral switch 294 as seen in FIG. 4 can be employed if this is desired. The switch would be in parallel relationship with respect to the switches 290 and 292. The switches and the coupling lock lever shown in FIG. 4 are the elements of the control system that are in the driver's cockpit console. If a neutral condition is selected, the coupling dog teeth 104 and 102 can remain locked.

During neutral operation with the engine running and the vehicle stationary, the switch 290 is closed and the switch 292 is closed. The coupling lock-out lever is unlocked when the vehicle is accelerated from a standing start. The switch 290 is closed to achieve a low-speed ratio condition and the switch 292 is opened to the drive position. The overrunning coupling lock lever remains unlocked during lap cycling. After the vehicle is on the track, the switch 290 can be moved selectively to the open position or the closed position as the switch 292 remains open. At this time the overrunning coupling lock lever is in the locked position.

During acceleration from a standing start after the switch 292 is moved to the open or drive position, the throttle is backed-off thereby permitting synchronism in the speed of gear 84 with respect to the speed of the shaft 28. After synchronism is achieved, the coupling teeth 102 and 104 can be engaged. The throttle then is reopened as acceleration is continued.

During lap cycling, an upshift from the low-speed ratio to the high-speed ratio can be achieved under wide open throttle conditions or any part throttle condition because of the nonsynchronous upshift characteristic provided by the overrunning clutch 94. This upshift is achieved simply by opening the switch 290. To achieve a coasting downshift during lap cycling, the switch 290 is closed with the engine throttle closed.

The annular walls 160 and 164 maintain a reservoir of fluid behind each of the pistons 170 and 158. Because the clutches operate at relatively high speeds, the existence of such a counter-balance pressure chamber is required to overcome the centrifugal effects of the pressure in the clutch pressure chambers.

Having thus described a preferred embodiment of my invention, what I claim and desire to secure by United States Letters Patent is:

1. In a power transmission mechanism for an automotive vehicle driveline for delivering torque from an engine crankshaft to a power output gear comprising a first power input shaft connected directly to said crankshaft, a second power input shaft mounted co-axially with respect to said first power input shaft, a hydrokinetic coupling having an impeller connected to said crankshaft and a turbine connected to said second power input shaft, a power output shaft connected to said power output gear in spaced parallel relationship with respect to said power input shafts, a low-speed ratio input gear connected to said second power input shaft, a high-speed ratio input gear, a low-speed ratio output gear and a high-speed ratio output gear meshing respectively with said low-speed ratio input gear and said high-speed ratio input gear, said output gears being journalled rotatably about the axis of said output gear, said first power input shaft being connected to said high-speed ratio input gear, selectively engageable clutch means for connecting said high-speed ratio output gear and said low-speed ratio output gear to said output shaft, an overrunning coupling connection between said first power input shaft and said low-speed ratio input gear, and means for establishing and disestablishing said overrunning coupling connection.

2. The combination as set forth in claim 1 wherein said overrunning coupling connection comprises an overrunning clutch having an inner race and an outer race, one of said races being connected to said low-speed ratio input gear, and selectively engageable mechanical clutch means for connecting the other race to said first power input shaft to establish a low-speed ratio torque delivery path when the clutch means for said high-speed ratio output gear is disengaged.

3. The combintaion as set forth in claim 2 wherein said means for connecting said other race to said first input shaft comprises a selectively engageable clutch having teeth connected to said other race and other teeth connected to said first input shaft, and mechanical lever means for moving said teeth into engagement and out of engagement to establish and disestablish a driving connection through said overrunning coupling connection.

4. A geared transmission mechanism for establishing a driving connection between an engine and a power output gear comprising a first power input shaft connected to said engine, a fluid coupling having an impeller connected to said engine and a turbine, a second power input shaft connected to said turbine, a first power input gear connected to said second power input shaft, a second power input gear connected to said first power input shaft, first and second output gears meshing respectively with said first and second input gears, a power output shaft, a first fluid pressure operated clutch means for connecting said first output gear to said output shaft and a second fluid pressure operated clutch means for connecting said second output gear to said output shaft, a fluid pressure source, conduit structure connecting each clutch means to said pressure source including a neutral-drive shift valve situated in and partly defining a branch portion of said conduit structure extending to said first clutch means, another portion of said conduit structure extending from said first clutch means to said second clutch means, a high-low shift valve situated in and partly defining said last mentioned conduit structure portion whereby communication between said clutch means can be selectively interrupted, an overrunning clutch means connecting said first and second input shafts during low-speed ratio operation and means for selectively disabling said overrunning clutch means.

5. A geared transmission mechanism for establishing a driving connection between an engine and a power output gear comprising a first power input shaft connected to said engine, a fluid coupling having an impeller connected to said engine and a turbine, a second power input shaft connected to said turbine, a first power input gear connected to said second power input shaft, a second power input gear connected to said first power input shaft, first and second output gears meshing respectively with said first and second input gears, a power output shaft, a first fluid pressure operated clutch means for connecting said first output gear to said output shaft and a second fluid pressure operated clutch means for connecting said second output gear to said output shaft, a fluid pressure source, conduit structure connecting each clutch means to said pressure source including a neutral-drive shift valve situated in and partly defining a branch portion of said conduit structure etxending to said first clutch means, another portion of said conduit structure extending from said first clutch means to said second clutch means, a high-low shift valve situated in and partly defining said last mentioned conduit structure portion whereby communication between each clutch means can be selectively interrupted, an overrunning clutch means connecting said first and second input shafts during lowspeed ratio operation, means for selectively disabling said overrunning clutch means, a regulator valve means communicating with said pressure source for establishing a controlled output pressure for the latter and including a control pressure area thereon, an accumulator valve having a piston and an accumulator chamber slidably receiving said piston, one end of said chamber being connected to said second clutch means and the other end of said chamber being connected to said control area whereby a transitional reduction in the output pressure of said source is effected during a ratio change from the high-speed ratio to the low-speed ratio as said piston is stroked in said chamber.

6. The combination as set forth in claim 4 wherein said first and second clutch means each comprises a movable piston and a cylinder slidably receiving said piston to define a pressure chamber, a wall situated on one side of said piston and cooperating with said piston to define a clutch pressure balance chamber, the balance chamber of said first clutch means being in fluid communication with the pressure chamber of said second clutch means.

7. The combination as set forth in claim 5 wherein said first and second clutch means each comprises a movable piston and a cylinder slidably receiving said piston to define a pressure chamber, a wall situated on one side of said piston and cooperating with said piston to define a clutch pressure balance chamber, the balance chamber of said first clutch means being in fluid communication with the pressure chamber of said second clutch means.

References Cited

UNITED STATES PATENTS

| | | | |
|---|---|---|---|
| 2,142,199 | 1/1939 | Lysholm et al. | 74—720 X |
| 2,645,299 | 7/1953 | Vincent | 74—720 X |
| 2,772,581 | 12/1956 | Maier et al. | 74—732 |
| 2,943,503 | 7/1960 | Forster | 74—718 X |

MARK M. NEWMAN, Primary Examiner

T. C. PERRY, Assistant Examiner

U.S. Cl. X.R.

74—364